(12) United States Patent
Gemmati et al.

(10) Patent No.: US 8,393,569 B2
(45) Date of Patent: Mar. 12, 2013

(54) BREAKABLE COUPLING DEVICE, AND AN ASSOCIATED TRIM ACTUATOR

(75) Inventors: Bernard Gemmati, Lauris (FR); Philippe Vincent, Nans les Pins (FR); Romuald Biest, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 639 days.

(21) Appl. No.: 12/468,285

(22) Filed: May 19, 2009

(65) Prior Publication Data
US 2009/0283642 A1    Nov. 19, 2009

(30) Foreign Application Priority Data
May 19, 2008    (FR) ...................................... 08 02682

(51) Int. Cl.
*B64C 13/00*    (2006.01)
(52) U.S. Cl. ...................................... 244/99.2; 192/56.5
(58) Field of Classification Search ................. 192/56.5, 192/56.56, 55.1; 244/99.2
See application file for complete search history.

(56) References Cited

U.S. PATENT DOCUMENTS

| | | | | |
|---|---|---|---|---|
| 2,401,992 A | * | 6/1946 | Waller | 192/56.52 |
| 4,041,729 A | * | 8/1977 | Bilz | 192/56.5 |
| 4,255,946 A | * | 3/1981 | Hansen | 464/36 |
| 4,770,281 A | * | 9/1988 | Hanks | 192/56.33 |
| 6,059,085 A | * | 5/2000 | Farnsworth | 192/55.1 |

* cited by examiner

*Primary Examiner* — Tien Dinh
*Assistant Examiner* — Keith L Dixon
(74) *Attorney, Agent, or Firm* — Brooks Kushman P.C.

(57) ABSTRACT

A breakable coupling device for coupling together first and second main transmission shafts stationary in translation along a longitudinal axis of rotation of the device comprises a blocking device having a discontinuous first housing and a continuous second housing forming a closed loop; a compression device; at least one drive device connecting the blocking device and the compression device together in rotation about the longitudinal axis below a predetermined torque, wherein the discontinuous first housing is configured to receive the at least one drive device below the predetermined torque; and a shifting device configured to shift the at least one drive device non-reversibly from the discontinuous first housing towards the continuous second housing when the torque exerted on the at least one drive device is greater than the predetermined torque.

19 Claims, 2 Drawing Sheets

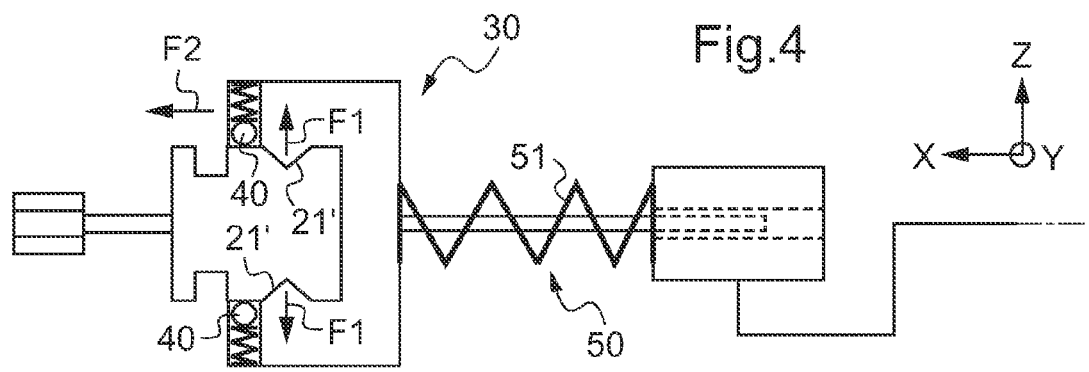
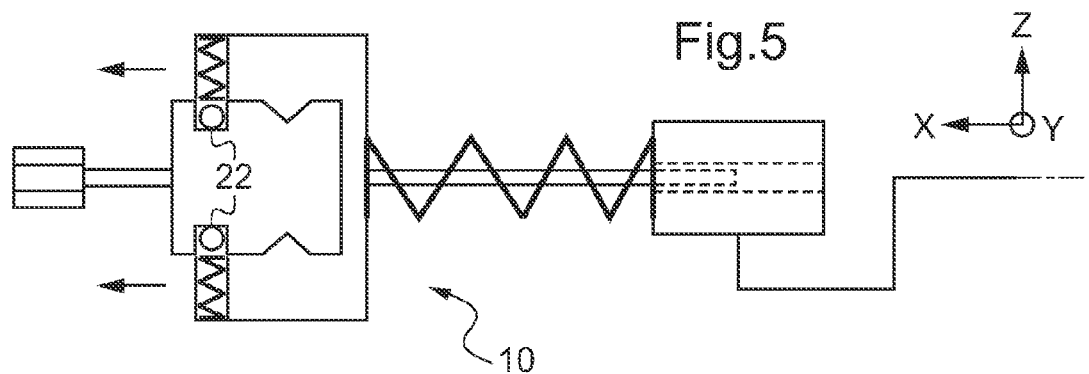
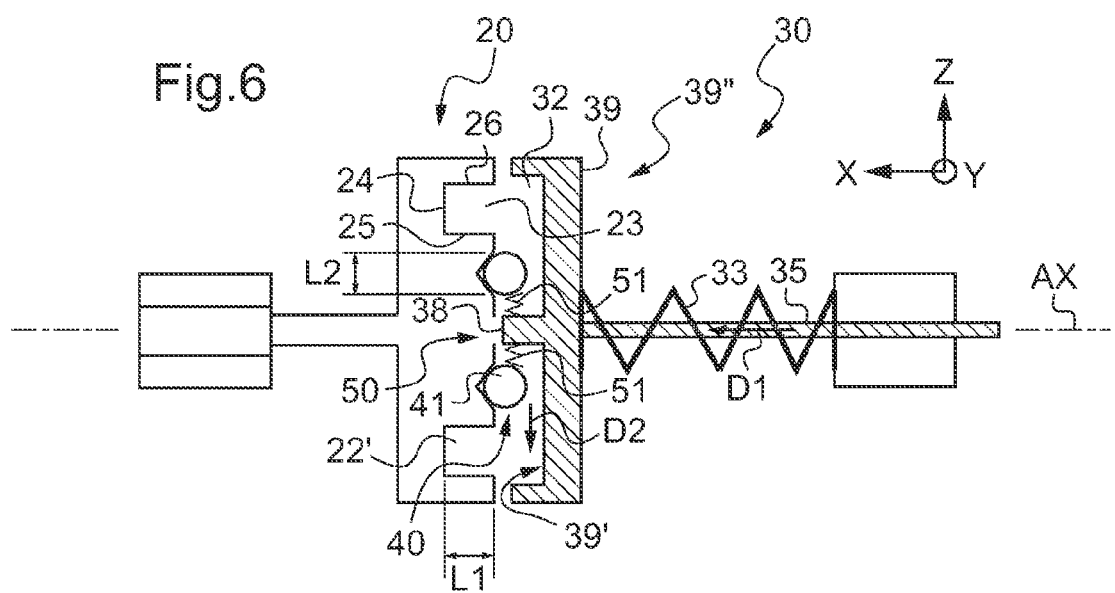

BREAKABLE COUPLING DEVICE, AND AN ASSOCIATED TRIM ACTUATOR

Priority is claimed to French Application No. FR 08 02682, filed on May 19, 2008, the entire disclosure of which is incorporated by reference herein.

The present invention relates to a breakable coupling device, and to the associated trim actuator.

BACKGROUND

It is conventional on an aircraft, and more particularly on a helicopter, to find actuators that are arranged in parallel or in series with flight control linkages. When arranged in parallel, such actuators are commonly referred to as "trim actuators" by the person skilled in the art. Thus, a helicopter may have a trim actuator associated with its longitudinal flight controls, a trim actuator associated with its lateral flight controls, a trim actuator associated with its collective pitch flight control, and a trim actuator associated with its yaw flight controls. Each trim actuator then performs both first and second functions.

The first function improves pilot comfort by enabling the pilot to anchor a given control in a given position. For example, by blocking the collective pitch trim actuator, the pilot no longer needs to hold the collective pitch with the appropriate lever, and can therefore pay attention to other tasks.

The second function of a trim actuator consists in enabling the neutral position of a flight control to be adjusted. Furthermore, if the aircraft is fitted with an autopilot system, the trim actuator can provide information to the autopilot system. A sensor for measuring the position of a mechanical element of a trim actuator can transmit said information to the autopilot system, which can deduce therefrom the position of the associated flight control.

Under such conditions, a trim actuator generally includes a motor for driving an outlet shaft in rotation, which shaft is connected to the associated flight control by a connecting rod. For example, when the motor is actuated by the pilot, the outlet shaft of the trim actuator rotates and moves the flight control. In contrast, when the pilot acts on the flight control, it is the flight control that causes the outlet shaft to rotate and consequently rotates the rotor of the trim actuator motor relative to its stator.

That type of actuator thus satisfies requirements. Nevertheless, it is found that in the event of the motor that forms part of the trim actuator becoming jammed, that inevitably leads to a situation that is catastrophic since the flight control becomes blocked.

It is therefore essential to be able to break the connection between the trim actuator and the associated flight control, should that be necessary. For this purpose, actuator manufacturers provide a breakable pin to act as a "fuse", e.g. between the outlet shaft and the connecting rod connecting it to a flight control. In the event of the actuator jamming, the pilot can act on the flight control and shear the pin. Although satisfactory, that solution requires the pin to be suitably dimensioned so that the force at which it breaks is neither too small nor too great. Furthermore, the pin does not necessarily break in an optimum manner. Consequently, it is possible that the flight controls continue to be impeded by a faulty trim actuator. The presently-existing solution is thus not completely satisfactory.

As a remedy, it might be envisaged to implement a suitable torque limiter in the trim actuator, the torque limiter decoupling the trim actuator motor from the flight control above a determined level of torque. In general, torque limiters comprise first and second plates that are connected together by drive means, e.g. balls. Each of the first and second plates then has a discontinuous housing provided with a plurality of orifices that are distributed equidistantly around a circle.

Below a predetermined torque, each ball is held in place, being inserted firstly in an orifice in the first plate and secondly in an orifice in the second plate. The first plate can thus drive the second plate in rotation via a connection via an obstacle, and vice versa. Above the predetermined torque, each ball leaves its orifice, thereby enabling the torque to be limited at said predetermined value, and subsequently penetrates into the next orifice. Since the balls continuously leave and enter the orifices, it will be understood that this technology is normally not suitable for being transposed into a trim actuator. That would require the pilot to fight continuously in order to work the flight controls in the event of the actuator motor jamming.

Furthermore, document U.S. Pat. No. 2,401,992 describes a device for coupling together first and second main shafts, the device being provided with blocking means, compression means, and drive means. The blocking means comprises a conical inside face provided with a first housing that is discontinuous and a second housing that is continuous.

Above a limit torque, the balls leave the first housing, slide over the conical face of the blocking means, and drop into the second housing. In order to reset that device, it then suffices to implement a simple axial action, since the device is reversible. Under such circumstances, that operation does not guarantee the operator to inspect the device as a safety precaution.

SUMMARY OF THE INVENTION

An aspect of the present invention is to provide a breakable coupling device, together with an associated trim actuator, that enables the above-mentioned limitations to be overcome by decoupling a trim actuator and the associated flight control permanently and in a manner that is certain.

The present invention provides a breakable coupling device for coupling first and second main transmission shafts that are stationary in translation along a longitudinal axis of rotation of the device with blocking means together with compression means and at least one drive means connecting the blocking means and the compression means together in rotation about the axis of rotation of the device providing said blocking means and compression means exert a torque on the drive means about said longitudinal axis of rotation of the device that lies below a predetermined level of torque. The blocking means is thus provided with a first housing that is discontinuous and that receives the drive means, e.g. a ball, below said predetermined torque.

Consequently, the drive means secures the blocking means and the compression means together in rotation about the axis of rotation of the device so long as the blocking means and the compression means exert torque on the drive means about said longitudinal axis of rotation of the device that is below a predetermined torque level.

The compression means then presses the drive means into the first housing of the blocking means, the drive means thus connecting together in rotation the compression means and the blocking means. In order to couple the first and second main transmission shafts together, it suffices to fasten the blocking means to the first main transmission shaft and the compression means to the second main transmission shaft.

Furthermore, the device of the invention is remarkable in that the blocking means include a second housing that is continuous, describing a closed loop, the device being provided with shift means suitable for shifting the drive means from the first housing to the second housing when the torque exerted on the drive means is greater than said predetermined torque level, and to do so in a manner that is not reversible, i.e. that cannot be reversed without the device being disassembled, and thus requiring human intervention.

Since the second housing is continuous, the drive means runs therealong without encountering any obstacles, thereby terminating any transmission of rotary motion from the compression means to the blocking means, and vice versa. Furthermore, decoupling is complete and final, until an approved mechanic takes action. The aircraft pilot is thus no longer confronted with the appearance of residual forces.

In addition, the device of the invention possesses one or more of the following additional characteristics. Advantageously, the first housing is provided with a succession of orifices formed along a path traveled by the drive means during its rotation about said axis of rotation in normal operation, i.e. when the blocking means are not blocked in rotation and are thus free to perform rotary motion about the longitudinal axis of rotation of the device.

This path is then made up of a succession of holes suitable for receiving the drive means, and of projections, more precisely crests. By being held in an orifice by the compression means, the drive means drive the blocking means in rotation with force being transmitted via obstacles, the drive means being set into motion by the compression means.

Conversely, when the blocking means are set into rotation, e.g. by a motor, the blocking means drive the drive means in rotation, which in turn drives the compression means in rotation. In the event of the first main transmission shaft jamming, the blocking means are no longer suitable for performing rotary motion. The drive means then leave the first housing and are shifted towards the second housing by the shift means acting via the compression means.

The second housing is optionally provided with a continuous groove that describes the entire path traveled by the drive means during its rotation about said axis of rotation in abnormal operation, i.e. when the blocking means are no longer free to perform rotary motion about the longitudinal axis of rotation of the device. It should be observed that the second housing does not have any obstacles, thereby enabling the blocking means to be decoupled from the compression means.

Furthermore, the continuous groove of annular shape, presents a first dimension that is greater than a second dimension of the drive means so that the drive means can no longer project from the continuous groove. When the drive means comprise a ball, the depth of the groove is greater than the diameter of the ball.

In abnormal operation, i.e. when the torque exerted on the drive means is greater than said predetermined torque level, the drive means then drop into the groove and no longer come into contact with the compression means, thereby guaranteeing the absence of any residual forces.

Consequently, it is not possible to reset the coupling device without human intervention, requiring the device to be disassembled and reassembled. Mere axial thrust can under no circumstances enable the drive means to be reengaged in the first housing.

In a first embodiment, the continuous groove may be in the form of a cylinder provided with first and second bases connected together by an internal peripheral wall, the external periphery of the groove facing said compression means being open so as to allow said drive means to pass therethrough.

In addition, the compression means comprise a cylindrical tube presenting at its first end one radial compression chamber per drive means, each radial compression chamber being open to the blocking means, and each drive means projecting in part from the associated compression chamber.

The compression chamber then acts as means for guiding the drive means. In order to exert a radial force on the drive means and to press them against the blocking means, the compression means are provided with at least one compression spring arranged in the compression chamber and suitable for exerting a force on the drive means.

For example, a compression spring is arranged in a cell within the cylindrical tube, the compression spring being secured to a ball of the drive means under normal conditions, i.e. when the force exerted on the drive means is less than a predetermined torque level, the compression spring exerting pressure on the ball, e.g. via a blade fastened to the turns of the spring.

Under such conditions, the base of the cylindrical tube situated at the second end of said cylindrical tube is secured to a shift spring of the shift means, the shift spring being arranged in a first direction that coincides with said axis of rotation and that is perpendicular to a second direction along which at least one compression spring of the compression means is arranged.

On expanding, the shift spring moves the compression means in translation along the axis of rotation of the device, and thus moves the drive means so that the drive means move from the first housing towards the second housing. Furthermore, in order to transmit its rotary motion to a second main transmission shaft, the compression means possess a secondary motion transmission shaft that extends the second main transmission shaft for coupling. In addition, the shift means include a shift spring and the shift spring surrounds the secondary transmission shaft in order to ensure that the device is compact.

In a second embodiment, the groove is in the form of a cylinder provided with first and second bases interconnected by an internal peripheral wall and an external peripheral wall, the first base of the groove facing said compression means being open so as to allow said drive means to pass therethrough.

Furthermore, the compression means comprises a plate having a first face presenting one radial compression chamber per drive means, the radial compression chamber being open to the blocking means and the drive means projecting in part from said compression chamber. The compression chamber then acts as guide means for guiding the drive means in contact with the blocking means.

Unlike the first embodiment, the shift means are suitable for exerting a force directly on the drive means in order to move them in translation. Furthermore, a second face of the plate of the compression means is secured to a compression spring of the compression means, the compression spring being arranged in a first direction that coincides with the axis of rotation and that is perpendicular to a second direction along which at least one shift spring of the shift means is arranged.

The compression means comprise a compression spring, which compression spring surrounds a secondary transmission shaft of the device, the secondary motion transmission shaft extending the second main transmission shaft for coupling.

Regardless of the embodiment, the secondary transmission shaft advantageously includes secondary longitudinal fluting so as to be constrained in rotation with the second main transmission shaft.

The secondary longitudinal fluting serves to constrain the secondary transmission shaft in rotation with the second main transmission shaft and also allows the secondary transmission shaft to move in translation along said axis of rotation relative to the second main transmission shaft.

The present invention also provides an aircraft trim actuator provided with first and second main transmission shafts and with a motor suitable for setting the first main transmission shaft into rotation. The trim actuator is remarkable in that it is provided with a coupling device of the invention for coupling together said first and second main transmission shafts, the blocking means being secured to the first main transmission shaft and the compression means being mechanically linked in rotation about the axis of rotation to the second main transmission shaft. Furthermore, the trim actuator optionally includes a crank provided with a wrist pin and a connecting rod for connecting the second main transmission shaft to a flight control, the wrist pin being fastened to the second main transmission shaft and to the connecting rod. The wrist pin enables the crank to avoid coming into contact with a structural element preventing the second main transmission shaft from moving in translation.

Furthermore, since the compression means are provided with a secondary transmission shaft fitted with secondary longitudinal fluting, the second main transmission shaft has primary longitudinal fluting that co-operates with the secondary longitudinal fluting in order to constrain the secondary transmission shaft in rotation with the second main transmission shaft while allowing the secondary transmission shaft to move in translation along said axis of rotation.

Furthermore, the trim actuator advantageously includes means for preventing the first and second main transmission shafts from moving in translation along said axis of rotation of the coupling device. For example, these means may comprise bearings that allow rotary motion only.

BRIEF DESCRIPTION OF THE DRAWINGS

The invention and its advantages appear in greater detail from the following description of embodiments given by way of illustration with reference to the accompanying figures, in which:

FIG. 4 is a diagrammatic section view of a trim actuator provided with a decoupling device in a first embodiment, when blocking occurs;

FIG. 5 is a diagrammatic section view of a trim actuator provided with a decoupling device of a first embodiment, in the decoupled position; and FIG. 6 is a diagrammatic section view of a trim actuator in the coupled position provided with a decoupling device constituting a second embodiment.

Elements that are present in more than one of the figures are given the same references in each of them.

Three mutually orthogonal directions X, Y, and Z are shown in the figures.

DETAILED DESCRIPTION

Figure 1:
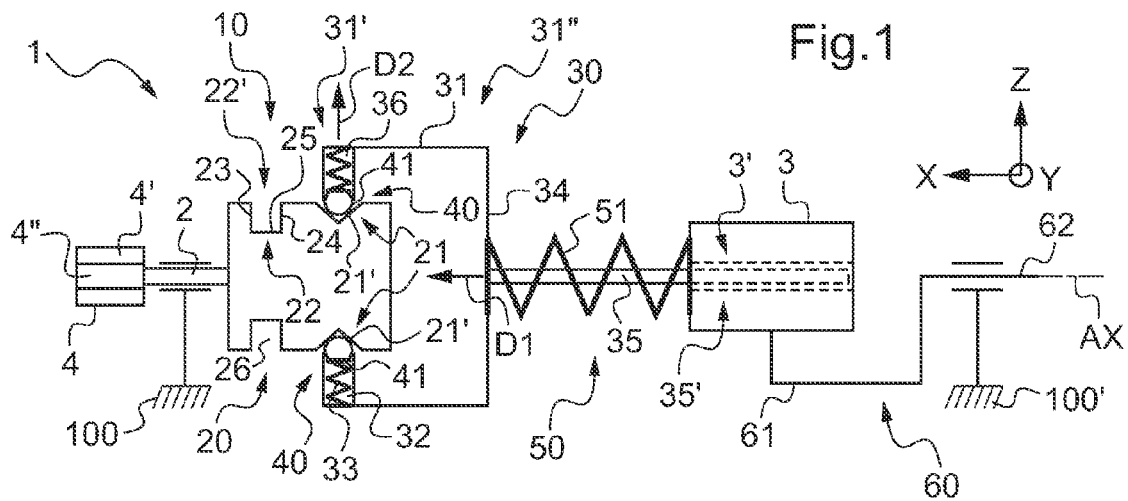
FIG. 1 is a diagrammatic section of a trim actuator in the coupled position provided with a decoupling device constituting a first embodiment.

FIG. 1 is a diagrammatic section of a trim actuator 1 in the coupled position. This trim actuator 1 comprises successively, from left to right in FIG. 1: a motor 4 provided with a stator 4' and a rotor 4"; a first main transmission shaft 2; a coupling device 10; and a second main transmission shaft 3; and then a crank 60 for connecting it to a flight control of an aircraft, for example the blade collective pitch control of a rotorcraft. It can be observed that it is perfectly possible to connect the crank 60 of the second main outlet shaft 3 to the motor of the actuator, and to connect its first main outlet shaft 2 to the flight control.

In addition, the trim actuator 1 is provided with an outer casing (not shown) that covers the above component elements. Furthermore, in order to constrain the first main transmission shaft 2 in rotation with the second main transmission shaft 3, while allowing decoupling that is not reversible without human intervention above a certain threshold, the coupling device 10 includes blocking means 20, compression means 30, at least one drive means 40, and shift means 50 for moving the drive means 40;

The blocking means 20 are secured to the first main transmission shaft 2. Since this first shaft is supported by a bearing 100 of the usual type, representing means for preventing the trim actuator from moving in translation, while allowing rotary movement only about the longitudinal axis of rotation AX of the coupling device 10, the assembly comprising the first transmission shaft 2 and the blocking means 20 is held stationary in translation along the axis of rotation AX, while being free to move in rotation about said axis of rotation AX. Similarly, the compression means 30 comprise a secondary transmission shaft 35 that co-operates with the second main transmission shaft 3 so that the secondary transmission shaft 35 is constrained in rotation about the axis of rotation AX with the second main transmission shaft 3.

Consequently, the secondary transmission shaft 35 is fitted by way of example with external secondary longitudinal fluting 35' passing through the inside of the second main transmission shaft 3 to co-operate with internal primary longitudinal fluting 3' of the second main transmission shaft 3.

Given this arrangement, it should be observed that the secondary transmission shaft 35, and thus the compression means 30, are capable of moving in translation along the longitudinal axis AX of rotation and symmetry of the coupling device 10. In contrast, the second main transmission shaft 3 is stationary in translation.

In order to be connected to a flight control, the second main transmission shaft 3 is extended by a crank 60. This crank possesses a wrist pin 61 secured to the second main transmission shaft 3 to avoid interfering with the secondary transmission shaft 35, and then a connecting rod 62 for coupling mechanically to a flight control.

The connecting rod 62 then passes through a bearing 100' of means for holding the trim actuator stationary, allowing it to move in rotation about the axis of rotation AX while preventing it from moving in translation along said axis of rotation AX.

In order to couple the first and second main transmission shafts 2 and 3 together below a certain threshold, the coupling device includes at least drive means 40 for constraining the compression means 30 in rotation with the blocking means 20. The blocking means 20 and the compression means 30 are secured in rotation with the first and second main transmission shafts respectively, so the drive means 40 do indeed perform the intended purpose.

More precisely, independently of the embodiment, the blocking means 20 comprise a first discontinuous housing 21' having a succession of orifices along the path traveled by the drive means in normal operation, i.e. when the coupling device 10 is in the coupled position. In addition, the blocking means 20 have a second continuous housing 22 provided with an annular groove 22' describing the path traveled by the drive means 40 when they rotate about the blocking means 20 during abnormal operation, i.e. when the coupling device 10 is in the decoupled position.

Thus, in the coupled position, the compression means 30 compress the drive means into the first housing. For example, the coupling device has a plurality of drive means, each drive means comprising a ball 41, with the compression means 30 urging each ball 41 into an orifice 21' of the first housing. If the torque exerted on the drive means 40 by the blocking means 20 and the compression means is less than a predetermined torque, then the balls 41 constituting the drive means 40 remain in their orifices 21.

Consequently, any rotation of the first main transmission shaft 2, and thus of the blocking means 20 secured thereto, gives rise to rotation of the means 40 providing drive via obstacles. In turn, the drive means 40 cause the compression means 30 to rotate about the axis of rotation AX, and hence the second main transmission shaft 3.

Conversely, any rotation of the second main transmission shaft 3, and thus of the compression means 30 secured thereto in rotation about the axis of rotation AX, gives rise to a rotation of the drive means 40. The drive means 40 in turn drive the blocking means 20 in rotation and thus the first main transmission shaft 2. However, beyond the predetermined torque, the balls 41 of the drive means 40 escape from the orifices 21 of the first discontinuous housing 21 and are moved by the shift means 50 towards the second housing 22 of the blocking means. Since the second housing 22 is continuous, it does not present any obstacle, thereby enabling the blocking means 20 to be decoupled in rotation about the axis of rotation AX from the compression means 30, and thus decoupling the first main transmission shaft 2 from the second main transmission shaft 3. This decoupling is not reversible insofar as it is necessary for a technician to take action in order to return the coupling device to the coupled position.

In addition, independently of the embodiment selected, the continuous groove 22' presents a first dimension L1 that is greater than a second dimension L2 of the drive means 40 so that the drive means 40 can under no circumstances project and escape from the continuous groove 22' once engaged therein. FIGS. 1 to 5 show more particularly a first embodiment of the invention.

Figure 2:
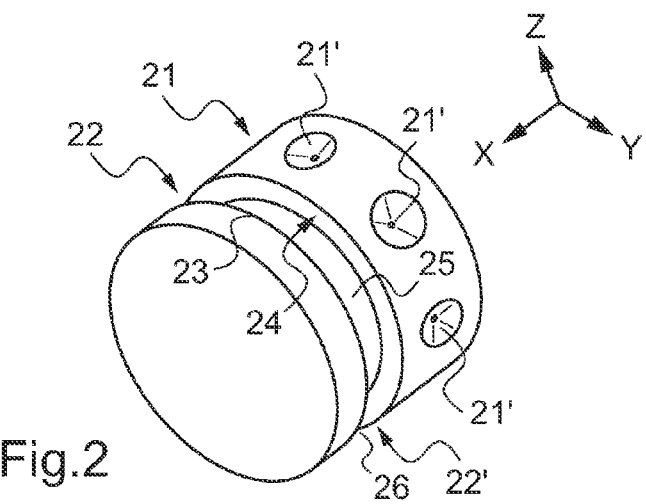
FIG. 2 is an isometric view of blocking means of the invention in a first embodiment of a decoupling device.

In this first embodiment, with reference to FIGS. 1 and 2, the first and second housings 21 and 22 are arranged in succession along the axis of rotation AX. Furthermore, the groove 22' of the second housing 22 is in the form of a cylinder provided with first and second bases 23 and 24 interconnected by an internal peripheral wall 25 constituting the bottom of the groove. To enable the balls of the drive means 40 to enter into the groove 22', the outer periphery 26 of this groove 22' facing the compression means in the decoupled position is open.

FIG. 2 shows clearly the first and second housings 21 and 22. More particularly, it should be observed that the first and second housings 21 and 22 are respectively discontinuous and continuous.

Figure 3:
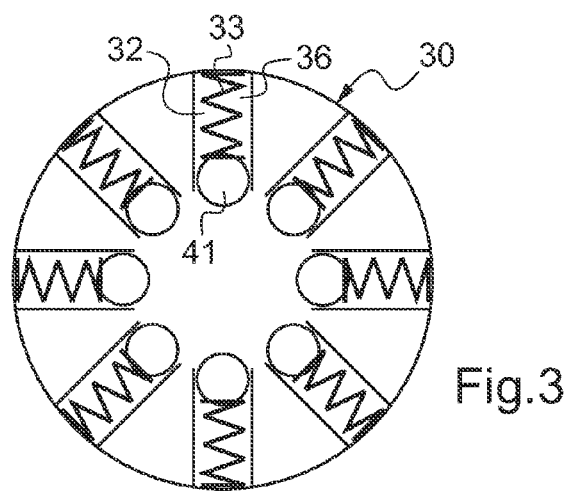
FIG. 3 is a section of compression means of the invention in a first embodiment of a decoupling device.

With reference to FIGS. 1 and 3, the compression means 30 are suitable for being constrained in rotation with each of the drive means 40. The compression means 30 comprise a cylindrical tube 31 presenting shells 36, each defining a respective radial compression chamber 32 that opens out solely to the blocking means 20. The coupling device 10 has a plurality of distinct drive means, i.e. a plurality of balls, and each drive element 40 is arranged in a radial compression chamber 32 formed at the open first end 31' of the cylindrical tube 31. More precisely, all the drive means 40 are arranged in radial compression chambers 32 so as to be in contact with compression springs 33 of the compression means 30 via blades fastened to said compression springs, for example, the drive means 40 project at least in part from the associated compression chambers. The drive means project in part from the associated compression chambers in the normal condition and they project completely from the compression chambers when they drop into the continuous groove 22'. The base of the cylindrical tube 31 located at the second end 31" of the cylindrical tube 31 is then secured to the shift means 50, i.e. to a shift spring 51 connecting said base to the second main transmission shaft 3. This shift spring 51 is thus disposed along a first direction D1 that coincides with the axis of rotation AX, whereas, in contrast, the compression springs 33 of the compression means 30 are all disposed along second directions D2 that are radial, i.e. perpendicular to said first direction. In addition, it should be observed that the shift spring 51 partially surrounds the secondary transmission shaft 35 of the compression means 30.

With reference to FIG. 1, in the coupled position, the various drive means are held in orifices 21' of the first housing 21 of the blocking means.

With reference to FIG. 4, beyond a predetermined torque exerted on the drive means 40, these drive means 40 escape from their orifices 21' in the direction of arrows F1. Since the drive means 40 are no longer blocked in the first housing 21, the shift spring 51 of the shift means 50 can expand. Since the second main transmission shaft is stationary in translation because of the presence of means 100' preventing it from moving in translation, the compression spring 51 pushes against the compression means 30 that move in translation along arrow F2. Since the drive means 40 are connected to the compression means 30 and are held captive in part by the associated radial compression chambers 32, the drive means 40 move together with the compression means 30.

With reference to FIG. 5, the drive means 40 then reach the second housing 22. Each compression spring 33 then pushes the associated drive means 40 into the continuous groove of the second housing 22. Since the second housing 22 is continuous, the drive means 40 no longer encounter any obstacles suitable for pushing them or being pushed by them. Consequently, the coupling device 10 is in a decoupled position. It should be observed that regardless of its position, the secondary shaft is always arranged in part inside the second main transmission shaft 3 so as to keep the compression means 30 in place.

FIG. 6 shows a second embodiment. Unlike the first embodiment, the first and second housings within the blocking means are no longer one after another along the axis of rotation AX, but rather one above the other. The groove 22' of the second housing 22 is in the form of an annular cylinder provided with first and second bases 23 and 24 and with an internal peripheral wall 25 and an external peripheral wall 26, the first base 23 facing the compression means 30 being open so as to enable the drive means 40 to penetrate into the groove 22'. The second base 24 then constitutes the bottom of the groove 22. Furthermore, it is no longer the compression spring of the compression means 30 that comes into contact with the drive means, but rather the shift means 50.

In the second embodiment, the compression means 30 include a plate 39. This plate 39 is provided on its first base 39', facing the blocking means, with a plurality of radial compression chambers opening out solely to the blocking means 20. The drive means 40 are then disposed inside radial compression chambers 32, while being in contact with respective shift springs 51 of the shift means 50, the drive means 40 projecting at least in part from the associated compression chamber. Thus, the drive means 40 are fastened to a shoulder 38 of the blocking means 20 constituting the bottoms of the radial compression chambers 32, via a respective shift spring 51.

The second face 39" of the plate 39 is secured to the compression spring 33 connecting said second face 39" to the second main transmission shaft 3. The compression spring 33 is thus disposed along a first direction D1 coinciding with the axis of rotation AX, whereas on the contrary the shift springs 51 of the shift means are all disposed along respective second directions D2 that are radial, being perpendicular to said first direction.

It should also be observed that the compression spring 33 then surrounds part of the secondary transmission shaft 35 of the compression means 30.

As in the first embodiment, above a predetermined torque, the drive means escape from their orifices in the first housing and are then pushed towards the second housing of the blocking means.

Naturally, the present invention may be subjected to numerous variants concerning its implementation. Although several embodiments are described above, it will be understood that it is not conceivable to identify exhaustively all possible embodiments. It is naturally possible to replace any of the means described by equivalent means without thereby going beyond the ambit of the present invention.

What is claimed is:

1. A breakable coupling device for coupling together first and second main transmission shafts stationary in translation along a longitudinal axis of rotation of the device, the coupling device comprising:
    a blocking device having a discontinuous first housing with a series of generally conical openings and a continuous second housing forming a closed loop and offset longitudinally from the series of openings;
    a compression device;
    at least one drive device connecting the blocking device and the compression device together in rotation about the longitudinal axis below a predetermined torque, wherein one of the openings of the series of openings of the discontinuous first housing is configured to receive the at least one drive device below the predetermined torque; and
    a shifting device configured to shift the at least one drive device non-reversibly from the series of openings of the discontinuous first housing towards the continuous second housing when the torque exerted on the at least one drive device is greater than the predetermined torque.

2. The coupling device as recited in claim 1, wherein the shifting device includes a shift spring configured to move the at least one drive device in translation from the discontinuous first housing towards the continuous second housing.

3. The coupling device as recited in claim 1, wherein the series of openings of the discontinuous first housing is disposed along a path traveled by the at least one drive device during a rotation about the longitudinal axis.

4. The coupling device as recited in claim 1, wherein the compression device is configured to exert a force on the at least one drive device biasing the at least one drive device towards the blocking device.

5. The coupling device as recited in claim 1, wherein the at least one drive device is a ball; and
    wherein the closed loop of the continuous second housing is defined by a continuous groove disposed along a path traveled by the at least one drive device during a rotation about the longitudinal axis, the continuous groove having a depth greater than a diameter of the ball so that the ball does not project beyond the continuous groove.

6. The coupling device as recited in claim 5, wherein the continuous groove includes a first planar wall and a second planar wall interconnected by an internal peripheral wall and an external periphery facing the compression device and open so as to allow the drive device to pass through the external periphery, wherein the first planar wall is generally parallel to the second planar wall.

7. The coupling device as recited in claim 1, wherein the compression device includes a cylindrical tube having at least one radial compression chamber disposed at a first end of the cylindrical tube and configured to house the at least one drive device, wherein the at least one radial compression chamber opens toward the blocking device and the at least one drive device projects partially from the at least one radial compression chamber.

8. The coupling device as recited in claim 7, wherein the compression device includes at least one compression spring disposed in the at least one radial compression chamber.

9. The coupling device as recited in claim 7, wherein the cylindrical tube has a second end and a base disposed at the second end secured to a shift spring of the shifting device disposed along a first direction coinciding with the longitudinal axis of rotation, the shift spring configured to expand thereby moving the drive means from the first housing towards the second housing, wherein the compression device includes at least one compression spring disposed along a second direction perpendicular to the first direction.

10. The coupling device as recited in claim 5, further comprising a secondary transmission shaft configured as an extension of the second main transmission shaft, wherein the shifting device includes a shift spring surrounding the secondary transmission shaft.

11. The coupling device as recited in claim 5, wherein the continuous groove is cylindrical and includes a first base and a second base interconnected by an internal peripheral wall, and an external periphery facing the compression device and open so as to allow the drive device to pass through the external periphery.

12. The coupling device as recited in claim 11, wherein the shifting device is configured to exert a force on the at least one drive device.

13. The coupling device as recited in claim 11, wherein the compression device includes a plate having a first face having at least one radial compression chamber disposed on the first face and configured to house the at least one drive device, wherein the at least one radial compression chamber opens toward the blocking device and the at least one drive device projects partially from the at least one radial compression chamber.

14. The coupling device as recited in claim 13, wherein the plate has a second face secured to a compression spring disposed along a first direction coinciding with the longitudinal axis of rotation and perpendicular to a second direction, and wherein the shifting device includes at least one shift spring disposed along the second direction.

15. The coupling device as recited in claim 11, further comprising a secondary transmission shaft configured as an extension of the second main transmission shaft, wherein the compression device includes a compression spring surrounding the secondary transmission shaft.

16. The coupling device as recited in claim 1, further comprising a secondary transmission shaft including a secondary longitudinal fluting so as to constrain rotation with the second main transmission shaft.

17. The coupling device as reciting in claim 1, wherein the compression device biases the drive device radially inward towards an outer periphery of the blocking device.

18. The coupling device as recited in claim 1, wherein each opening of the series of openings has a generally conical surface.

19. The coupling device as recited in claim 1, wherein a periphery of each opening of the series of openings is tapered.

* * * * *